June 10, 1952　　　H. N. BEVERIDGE　　　2,599,528
CAPACITANCE METER
Filed Oct. 29, 1945
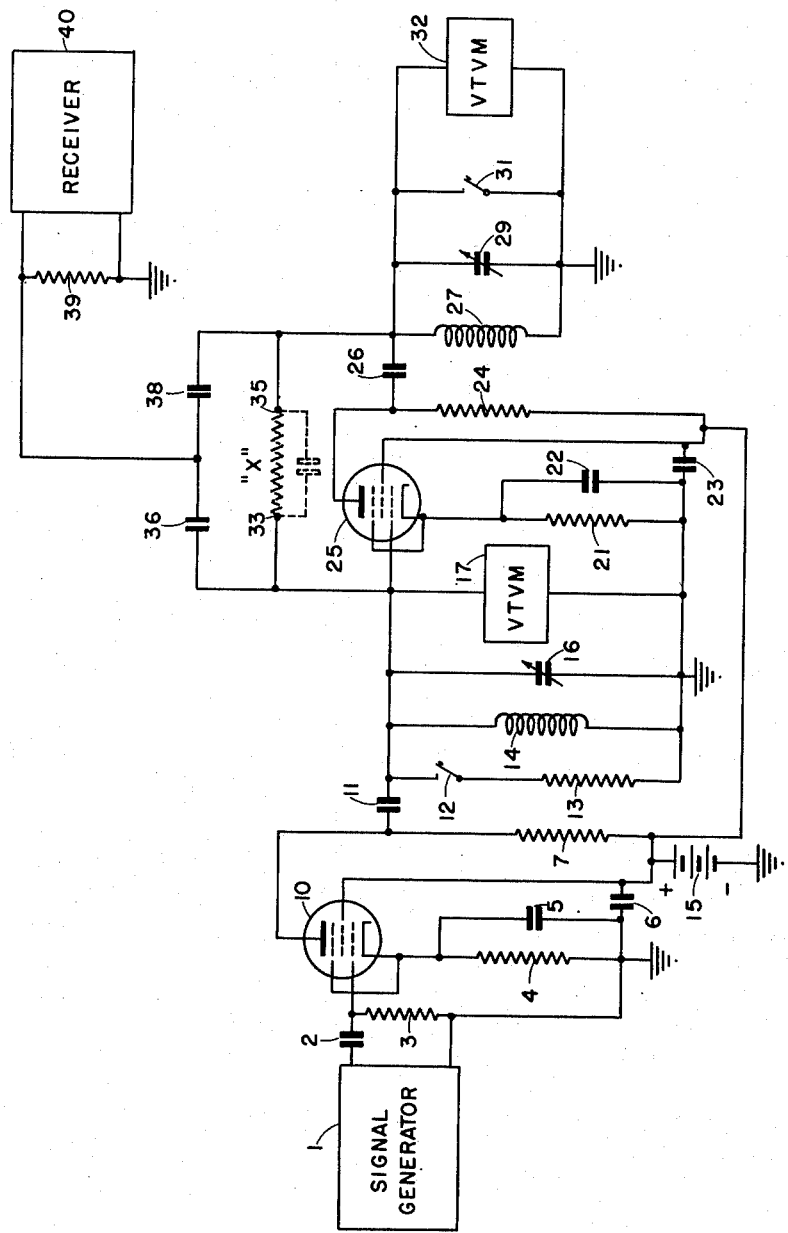
Inventor
HAROLD N. BEVERIDGE
By Ralph L. Chappell
Attorney Patented June 10, 1952

2,599,528

UNITED STATES PATENT OFFICE 2,599,528

CAPACITANCE METER

Harold N. Beveridge, Washington, D. C., assignor to Honorary Advisory Council for Scientific and Industrial Research, Ottawa, Ontario, Canada, a body corporate of Canada Application October 29, 1945, Serial No. 625,426

7 Claims. (Cl. 175—183)

This invention relates to electrical measurement instruments; in particular it is directed to providing a means for accurately measuring very small capacitances.

Measurement of small capacitances, particularly small distributed capacitances characteristic of practical resistors, tube sockets, and other circuit elements, is often of great importance in high-frequency radio engineering. The most successful method afforded by the prior art for measuring small capacitances is a technique involving a high-frequency signal generator and a standard variable condenser. The standard variable condenser is incorporated in a tuned circuit and the circuit is tuned to resonance at the signal generator frequency. The unknown capacitance is then placed in shunt with the standard condenser and the circuit is tuned with the variable condenser until it is again resonant. The difference in capacity settings of the standard condenser is taken as the measure of the unknown capacitance.

The technique just described, known generally as the "comparison method," is reasonably accurate for measuring capacitances of a few tenths of a micro-microfarad or larger. Its limitations are the accuracy of calibration of the standard condenser, the degree of frequency stability of the signal generator, and the accuracy with which the precise condenser setting for resonance can be determined. These limiting factors combine in practical applications to make the comparison method of capacitance measurement unreliable for measuring capacitances of a tenth micro-microfarad or less.

The object of this invention is to provide a means for evaluating capacitances as small as a few thousandths of a micro-microfarad.

The invention will be described with reference to the appended drawing, which is a representation in schematic and block form of one embodiment of the invention.

Referring to the drawing, signal generator 1 may be any reasonably stable signal generator capable of producing very high frequencies. The actual frequency employed is not critical, but as a practical matter a relatively high frequency must be resorted to for measuring capacitances as small as those here involved. A frequency in the region from 30 to 100 mc./s. might be chosen. One output terminal of signal generator 1 is grounded; the other is coupled to the control grid of buffer amplifier tube 10 through coupling condenser 2. Grid-leak resistor 3 is connected between the control grid of tube 10 and ground. The cathode of tube 10 is returned to ground through the parallel combination of biasing resistor 4 and by-pass condenser 5. The screen grid of tube 10 is by-passed to ground by condenser 6 and is connected to the positive side of D.-C. source 15. The negative side of D.-C. source 15 is grounded. The suppressor grid of tube 10 is tied to the cathode; the plate of tube 10 is connected to the positive side of D.-C. source 15 through load resistor 7. The plate of tube 10 is connected to the control grid of tube 25 through condenser 11.

A carefully calibrated variable condenser 16, which serves as a capacitance standard, is connected between the control grid of tube 25 and ground. In parallel with condenser 16 are an inductance coil 14 and a high impedance A.-C. vacuum tube voltmeter 17. Coil 14 is proportioned to resonate at the signal frequency for some intermediate setting of condenser 16. Also connected between the grid of tube 25 and ground is a series circuit comprising switch 12 and resistor 13. Resistor 13 should have low resistance; two hundred ohms might be an appropriate value. The suppressor grid and cathode of tube 25 are connected together; the cathode is connected to ground through the parallel combination of biasing resistor 21 and by-pass condenser 22. The screen grid of tube 25 is bypassed to ground by condenser 23 and is connected to the positive side of D.-C. source 15. The plate of tube 25 is connected to the positive side of D.-C. source 15 through plate load resistor 24. Inductance coil 27, condenser 29, and high-impedance A.-C. vacuum tube voltmeter 32 are connected in parallel, one side of the combination being grounded. Coil 27 is proportioned to resonate at the signal frequency for some median setting of condenser 29. The ungrounded side of the parallel circuit just described is connected to the plate of tube 25 through coupling condenser 26. A shorting switch 31 is connected across variable condenser 29.

Small condensers 36 and 38 are connected in series between the grid of tube 25 and the ungrounded side of condenser 29. The junction of condensers 36 and 38 is connected to ground through a low resistance 39, which may be about fifty ohms. A sensitive radio receiver 40, of conventional construction, tunable to the frequency of signal generator 1, has its input terminals connected across resistor 39.

Terminal 33 is connected to the control grid of tube 25; terminal 35 is connected to the ungrounded side of condenser 29. The unknown capacitance to be measured may be connected between terminals 33 and 35; in the drawing a circuit element X is shown connected between these terminals. Element X is represented as having both resistance and capacitance, as will often be the case in practice.

The operation of the invention is based upon the well known fact that capacitance between the grid and plate of a vacuum tube functioning as an amplifier is "reflected" into the grid-cathode circuit as an admittance in shunt with the grid-cathode capacitance of the tube. In the general case the nature of this reflected admittance is complex, but in the special case where the A.-C. grid and plate voltages differ in phase by 180°, which is the only case involved in this embodiment of the invention, the grid-plate capacitance is reflected into the grid circuit as a pure capacitance equal to $C_t(1+A)$, where $C_t$ equals the total capacitance from grid to plate and A equals the magnitude of the voltage amplification, that is, the ratio of the A.-C. plate voltage amplitude to the A.-C. grid voltage amplitude.

In this invention the circuit element whose capacitance is to be measured is connected effectively between grid and plate of a vacuum tube functioning as a voltage amplifier, appropriate adjustments are made to effect a 180° phase relationship between the A.-C. grid and plate voltages, and the reflected capacitance in the grid circuit, as amplified by the tube, is measured by the comparison method. This reflected capacitance, being ten or more times the actual capacitance from grid to plate, is large enough to be accurately determined by the comparison technique. The magnitude of voltage amplification can be evaluated by comparing the readings of the vacuum tube voltmeters in the plate and grid circuits. With these values in hand, the total actual capacitance from grid to plate may be calculated easily. The unknown capacitance equals the total plate-grid capacitance less the inherent plate-grid capacitance of the tube, which is a constant quantity.

If the signal frequency is low and the impedance between the grid and plate is purely capacitive, the plate voltage of an amplifier tube is 180° out of phase with the grid voltage when the plate load impedance is a pure resistance, i. e., when the plate tank circuit is precisely resonant to the signal frequency. Where the frequency is high enough that electron transit time within the tube is an appreciable fraction of a period, or where a resistive component of impedance is present between the plate and grid, however, a resonant plate load circuit will not yield a 180° phase relation between the grid and plate voltages. Under such conditions the 180° phase relation is obtained when the plate load circuit is tuned to a critical point on the inductive side of resonance. The function of the network comprising condensers 36 and 38, resistor 39, and receiver 40 is to provide a convenient means for accurately tuning the plate load circuit of tube 25 to a setting which will produce the desired 180° phase relation between the plate and grid voltages. The condensers 36 and 38 both have very small capacitance, but condenser 36 should have greater capacitance than condenser 38, the ratio of their capacitances being roughly equal to the amplification of tube 25. In practice that amplification may be of the order of ten or twelve. Neither condenser 36 or 38 contributes appreciably to the grid-plate capacitance of tube 25 for the reason that their junction is connected to ground through resistance 39, which is 50 ohms or thereabouts and hence virtually a short circuit compared to the reactances of the condensers. In consequence condenser 36 is effectively between grid and cathode of tube 25 and hence in shunt with variable condenser 16. Condenser 38 is effectively between the plate and cathode of tube 25 and is thus in shunt with plate tuning condenser 29. When amplifier tube 25 is operative, the significant effect of condensers 36 and 38 is to add vectorially across resistor 39 a fraction of the A.-C. grid voltage and a fraction of the A.-C. plate voltage. The capacitances of condensers 36 and 38 are so proportioned that the magnitudes of the two components of voltage across resistor 39 are about equal. Consequently the magnitude of the resultant signal voltage across resistor 39 is almost wholly dependent on the phase of the two voltages, and it drops almost to zero when the phase of the plate voltage is 180° relative to the grid voltage. Receiver 40 acts as a sensitive detector of this resultant signal voltage.

The step-by-step procedure for measuring an unknown capacitance with the invention is as follows:

(1) The circuit element whose capacitance is to be measured is connected between terminals 33 and 35. (2) Switch 12 is closed, shunting resistor 13 across resistor 7 and making tube 10 a very low impedance voltage source, supplying a small but essentially constant voltage to the grid of tube 25. (3) Switch 31 being open, condenser 29 is then tuned until a null, or sharp minimum in signal strength, is detected in receiver 40. This null or minimum indicates that the plate circuit of tube 25 is so adjusted that the required 180° phase relation exists between the plate and grid voltages of tube 25. (4) Switch 12 is opened and switch 31 is closed. These operations place the grid tank in the circuit and short-circuit the plate tank, reducing the amplification of tube 25 to zero. Condenser 16 is now tuned to resonance as indicated by maximum reading on voltmeter 17. The capacitance setting is noted. (5) Switch 31 is opened and condenser 16 is tuned until grid circuit resonance is restored. The new capacitance setting of condenser 16 is noted and the change of capacitance is obtained by subtracting the second reading from the first. At this point the readings of voltmeters 32 and 17 are noted and the amplification determined by taking the ratio of the voltages. (6) The magnitude of the unknown capacitance is evaluated by substitution in the formula $$C_x = \frac{\Delta C}{A} - C_{gp}$$

where $C_x$ is the unknown capacitance, $\Delta C$ is the difference between the two settings of calibrated condenser 16, A is the magnitude of voltage amplification, and $C_{gp}$ is the inherent grid-plate capacitance. This latter quantity can, if desired, be measured simply by going through the foregoing steps with no unknown capacitance in the circuit, the inherent capacitance in such case being equal to $$\frac{\Delta C}{A}$$

The formula for the unknown capacitance, $$C = \frac{\Delta C}{A} - C_{gp}$$

may be easily derived from the equation obtained by equating the total grid circuit capacitances for the two conditions of resonance. This gives:

$$C + (C_x + C_{gp}) = (C - \Delta C) + (C_x + C_{gp})(1 + A)$$

where C is the initial capacitance setting of condenser 16 and the other symbols have the same meanings as in the formula. Solution of this equation for $C_x$ gives the formula as set forth.

It will be understood that the embodiment of the invention herein shown and described is exemplary only, and that the scope of the invention is to be determined by reference to the appended claims.

What is claimed is:

1. In an apparatus for measuring the capacitance of a capacitive element, an electron discharge device having a cathode, an anode and a control electrode connected to function as a voltage amplifier, control electrode-cathode circuit means applying an alternating voltage to said device, means connecting said element between said control electrode and said anode, impedance means connected between said anode and said cathode to maintain 180° phase relation between alternating voltage at said anode and alternating voltage at said control electrode so that the capacitance of said element is reflected into said circuit means at an increased value determined by the gain of said device, voltage measuring means coupled to said anode and said control electrode for determining the gain of said device and means measuring said reflected capacitance, the last-named means including tuning means for shifting the amplitude of the anode alternating voltage from a normal value thereof to zero value, variable reactance means included in said circuit means for adjusting said circuit means to resonance with said anode alternating voltage when the amplitude of said anode voltage is shifted to said zero value and when the amplitude of said anode voltage is at said normal value and means determining the reactance of said variable reactance means when adjusted to establish resonance with each of said amplitude values of said anode alternating voltage.

2. In an apparatus for measuring the capacitance of a capacitive element, an electron discharge device having a cathode, an anode and a control electrode connected to function as a voltage amplifier, control electrode-cathode circuit means applying an alternating voltage to said device, means connecting said element between said control electrode and said anode, impedance means connected between said anode and said cathode to maintain 180° phase relation between alternating voltage at said anode and alternating voltage at said control electrode so that the capacitance of said element is reflected into said circuit means at an increased value determined by the gain of said device, voltage measuring means coupled to said anode and said control electrode for determining the gain of said device, and means measuring said reflected capacitance, the last-named means including tuning means for shifting the amplitude of the anode alternating voltage from a normal value thereof to zero value, variable capacitance means included in said circuit means for adjusting said circuit means to resonance with said anode alternating voltage when the amplitude thereof is shifted to said zero value and when the amplitude thereof is at said normal value and means determining the capacitance of said variable capacitance means when adjusted to establish resonance with each of said amplitude values of said anode alternating voltage.

3. In an apparatus for measuring the capacitance of an unknown element, an electron discharge device having a cathode, an anode, and a control electrode connected to function as a voltage amplifier, said unknown element being connected between said anode and said control electrode, means in circuit with said anode to selectively disable the amplifying function of said device, control electrode circuit means including an adjustable calibrated capacitance capable of being tuned to resonance when said electron discharge device is not operating as an amplifier and capable of being tuned to resonance when said electron discharge device is operating as an amplifier whereby capacitance readings may be obtained from said calibrated capacitance and the capacitance of said unknown element may be computed.

4. In an apparatus for measuring the capacitance of an unknown element, an electron discharge device having a cathode, an anode, and a control electrode connected to function as a voltage amplifier, said unknown element being connected between said anode and said control electrode, a signal generator supplying a voltage to said control electrode, switch means in the anode circuit of said electron discharge device controlling the operation of said electron discharge device as an amplifier, control electrode circuit means including an adjustable calibrated capacitance capable of being tuned to resonance when said electron discharge device is not operating as an amplifier and capable of being tuned to resonance when said electron discharge device is operating as an amplifier whereby capacitance readings may be obtained from said calibrated capacitance and the capcitance of said unknown element may be computed.

5. In an apparatus for measuring the capacitance of an unknown element having a resistive component of impedance, an electron discharge device having a cathode, an anode, and a control electrode connected to function as a voltage amplifier, said unknown element being connected between said anode and said control electrode, a signal generator supplying a constant alternating voltage to said control electrode, anode circuit means including an adjustable capacitance to allow said anode circuit means to be tuned to the inductive side of resonance whereby a 180° phase relation between said control electrode voltage and said anode voltage is achieved, means in circuit with said anode to selectively disable the amplifying function of said device, control electrode circuit means including an adjustable calibrated capacitance capable of being tuned to resonance when said electron discharge device is not operating as an amplifier and capable of being tuned to resonance when said electron discharge device is operating as an amplifier whereby capacitance readings may be obtained from said calibrated capacitance and the capacitance of said unknown element may be computed.

6. In an apparatus for measuring the capacitance of an unknown element having a resistive component of impedance, an electron discharge device having a cathode, an anode, and a control electrode connected to function as a voltage amplifier, said unknown element being connected between said anode and said control electrode, a signal generator supplying a constant alternating voltage to said control electrode, anode circuit means including an adjustable capacitance and switching means, said switching means controlling the operation of said electron discharge device as an amplifier, said adjustable capacitance allowing said anode circuit means to be tuned to the inductive side of resonance whereby a 180° phase relation between said control electrode voltage and said anode voltage is achieved, control electrode circuit means including an adjustable calibrated capacitance capable of being tuned to resonance when said electron discharge device is not operating as an amplifier and capable of being tuned to resonance when said electron discharge device is operating as an amplifier whereby capacitance readings may be obtained from said calibrated capacitance and the capacitance of said unknown element may be computed.

7. In an apparatus for measuring the capacitance of an unknown element, an electron discharge device having an anode, a cathode, and a control electrode connected to function as a voltage amplifier, a signal generator supplying a constant alternating voltage to said control electrode, a pair of capacitances connected in series between said anode and said control electrode, a low impedance input receiver connected to said pair of capacitances at the midpoint between said capacitances, the ratio of capacitances of said pair of capacitances being approximately equal to the amplification of said electron discharge device, and a tunable anode circuit whereby the phase of the anode voltage may be tuned to 180° relation to the phase of the control electrode voltage as indicated by a null at the low impedance input receiver.

HAROLD N. BEVERIDGE.

REFERENCES CITED

The following references are of record in the file of this patent:

UNITED STATES PATENTS

| Number | Name | Date |
|---|---|---|
| 2,135,017 | Sharland | Nov. 1, 1938 |
| 2,282,696 | Barber | May 12, 1942 |
| 2,365,706 | Keinath | Dec. 26, 1944 |
| 2,371,395 | Keeling, Jr. | Mar. 13, 1945 |
| 2,381,155 | Frommer | Aug. 7, 1945 |
| 2,449,739 | Duttera | Sept. 21, 1948 |

OTHER REFERENCES

Hund, High Frequency Measurements, McGraw-Hill Book Co. 1933, page 225.